(12) United States Patent
Fujimoto et al.

(10) Patent No.: US 10,115,936 B2
(45) Date of Patent: Oct. 30, 2018

(54) LEAD-ACID BATTERY

(71) Applicant: GS Yuasa International Ltd., Kyoto-shi, Kyoto (JP)

(72) Inventors: Naoki Fujimoto, Kyoto (JP); Sosuke Fujita, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 457 days.

(21) Appl. No.: 14/573,917

(22) Filed: Dec. 17, 2014

(65) Prior Publication Data
US 2015/0171381 A1 Jun. 18, 2015

(30) Foreign Application Priority Data

Dec. 18, 2013 (JP) ................. 2013-261555
Sep. 29, 2014 (JP) ................. 2014-198342

(51) Int. Cl.
| | |
|---|---|
| *H01M 2/02* | (2006.01) |
| *H01M 10/06* | (2006.01) |
| *H01M 10/12* | (2006.01) |
| *H01M 10/16* | (2006.01) |
| *H01M 2/04* | (2006.01) |

(52) U.S. Cl.
CPC .......... *H01M 2/024* (2013.01); *H01M 10/06* (2013.01); *H01M 10/12* (2013.01); *H01M 10/16* (2013.01); *H01M 2/0439* (2013.01); *H01M 2220/20* (2013.01)

(58) Field of Classification Search
CPC ...... H01M 10/06; H01M 10/12; H01M 10/16; H01M 2220/20; H01M 2/024; H01M 2/0439; Y02E 60/126
See application file for complete search history.

(56) References Cited

U.S. PATENT DOCUMENTS

| | | | |
|---|---|---|---|
| 1,796,034 A | 3/1931 | Lyndon | |
| 5,556,722 A | 9/1996 | Amazutsumi | |
| 2005/0238955 A1* | 10/2005 | Hooke | ............... H01M 2/0434 429/181 |
| 2010/0203373 A1* | 8/2010 | Kawase | ............. H01M 2/0262 429/94 |
| 2010/0279157 A1* | 11/2010 | Koch | ................... H01M 2/024 429/63 |

(Continued)

FOREIGN PATENT DOCUMENTS

| | | |
|---|---|---|
| CN | 101904032 A | 12/2010 |
| DE | 1812728 A1 | 7/1969 |
| DE | 9115163 U1 | 4/1993 |

(Continued)

OTHER PUBLICATIONS

Machine translation of JP2009-259450 (Year: 2009).*
Extended European Search Report dated Mar. 5, 2015 issued for the corresponding European patent application No. 14194733.3.

*Primary Examiner* — Lingwen R Zeng
(74) *Attorney, Agent, or Firm* — Rankin, Hill & Clark LLP

(57) ABSTRACT

A lead-acid battery including: a power generating element; and a container accommodating the power generating element and having a narrowed portion that is partially provided at an outer wall and reduces an internal space, wherein the container has a corner of a thick portion that is thickened inward within a range not inwardly beyond the narrowed portion to be thicker than the outer wall.

12 Claims, 8 Drawing Sheets

(56) References Cited

U.S. PATENT DOCUMENTS

2010/0297478 A1    11/2010  Mashiko

FOREIGN PATENT DOCUMENTS

| | | | |
|---|---|---|---|
| ES | 2048684 | | 3/1994 |
| GB | 398630 | A | 9/1933 |
| JP | 4-15149 | | 2/1992 |
| JP | 04014847 | | 4/1992 |
| JP | 07-326331 | | 12/1995 |
| JP | 07326331 | | 12/1995 |
| JP | 2002198087 | A2 | 7/2002 |
| JP | 2007227394 | A2 | 9/2007 |
| JP | 2009-259450 | | 11/2009 |
| JP | 2009259450 | A  * | 11/2009 |
| JP | 2013-254628 | | 12/2013 |
| WO | 2012141608 | | 10/2012 |

* cited by examiner

# LEAD-ACID BATTERY

CROSS-REFERENCE TO RELATED APPLICATIONS

This application claims the benefit of Japanese patent applications No. 2013-261555, filed on Dec. 18, 2013, and No 2014-198342, filed on Sep. 29, 2014, which are incorporated by reference.

FIELD

The present invention relates to a technique for suppressing a crack of a container.

BACKGROUND

When a lead-acid battery discharges electricity, sulfuric acid in electrolyte solution is consumed and water is generated. The electrolyte solution is thus reduced in specific gravity. Electrolyte solution contain dilute sulfuric acid and included in a lead-acid battery typically tends to have a higher freezing point at lower specific gravity. The electrolyte solution in the lead-acid battery is occasionally frozen and increased in volume in a cold region. This causes a problem that a corner of a container is likely to crack. In particular, overdischarge (discharge of or exceeding a rated capacity) further decreases the specific gravity and increases the freezing point. The problem described above is serious in this case. Crack at a corner of a container can be possibly suppressed by thickening the corner of the container, for example, as described in JP-A-2009-259450. A container is defined in outer shape by a standard and the container can be thickened only inward in some cases.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Conventionally, such a corner of the container thickened inward reduces the internal space of the container. This is likely to cause defective insertion such as interference of an element (a power generating element) to be inserted with an inner wall of the container. If the element is reduced in size in order to solve such defective insertion, the battery is deteriorated in performance.

The present invention has been made in view of the circumstances mentioned above, and an object thereof is to keep insertability and size of an electrode plate as well as suppress a crack at a corner of a container.

An aspect of the present invention provides a lead-acid battery including: a power generating element; and a container accommodating the power generating element and having a narrowed portion that is partially provided at an outer wall and reduces an internal space; wherein the container has a corner of a thick portion that is thickened inward within a range not inwardly beyond the narrowed portion to be thicker than the outer wall.

The lead-acid battery according to the aspect can keep insertability and size of an electrode plate as well as suppress a crack at the corner of the container.

BRIEF DESCRIPTION OF DRAWINGS

The foregoing and other features of the present invention will become apparent from the following description and drawings of an illustrative embodiment of the invention in which.

Figure 1:
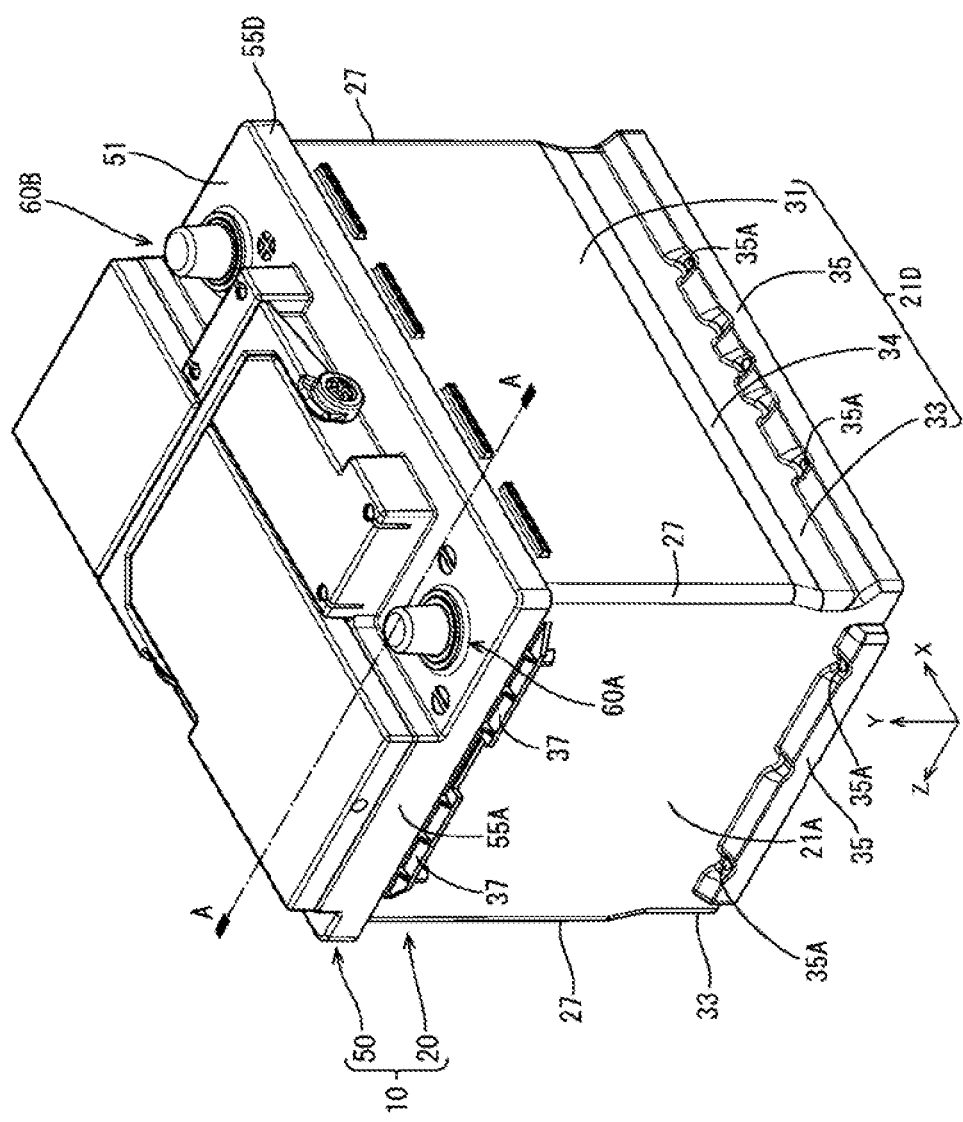
FIG. 1 is a perspective view of a lead-acid battery according to an embodiment 1 of the present invention.

DESCRIPTION OF EMBODIMENTS (Summary of the Embodiments)

A summary of a lead-acid battery according to the present embodiment is described initially. The lead-acid battery includes: a power generating element; and a container accommodating the power generating element and having a narrowed portion that is partially provided at an outer wall and reduces an internal space. The container has a corner of a thick portion that is thickened inward within a range not inwardly beyond the narrowed portion to be thicker than the outer wall.

In this configuration, the corner of the container is thickened and is thus unlikely to crack. Furthermore, the corner of the container is thickened inward and the container does not need to be changed in outer shape. Moreover, the corner of the container is thickened within the range not inwardly beyond the narrowed portion. The container is thus not reduced in accommodation space. This configuration can keep insertability of of the power generating element as well as suppress a crack at the corner of the container. The power generating element is also kept in size and the battery can be thus kept performance thereof.

In the lead-acid battery, the corner has an inner peripheral surface located outside an inner peripheral surface of the narrowed portion in the internal space. This configuration achieves insertability of the power generating element, more easily.

In the lead-acid battery when the corner equal in thickness to the outer wall has an inner peripheral radius defined as a reference radius, the inner peripheral radius of the corner is larger than the reference radius in a range not inwardly beyond the narrowed portion. The corner has an arc shape at the inner periphery in this configuration. Stress is thus unlikely to concentrate at one point and the corner of the container can be further suppressed from cracking.

In the lead-acid battery, the corner has an inside slanted from the outer wall within a range not inwardly beyond the narrowed portion. The inside of the corner is slant in this configuration. Stress is thus unlikely to concentrate at one point and the corner of the container can be further suppressed from cracking.

In the lead-acid battery, the container comprises a plurality of outer walls and a bottom wall, and has a box shape with an opening in one direction, the narrowed portion is disposed at a bottom side of the outer walls, and in the corner at which two of the outer walls forming the container intersect, a portion closer to the opening than the narrowed portion comprises the thick portion. In a case where the narrowed portion is disposed at a bottom side of the outer walls forming the container, the volume of the container is larger at a top side that is closer to the opening than the bottom side. Thus, a crack is likely to occur at the top side in which a larger amount of electrolyte solution is contained and the volume expansion of the electrolyte solution in accordance with freezing thereof is larger. Thus, in the lead-acid battery, a portion of the corner closer to the opening and top side than the narrowed portion comprises the thick portion. In other words, the corner closer to the opening side where a crack is likely to occur is reinforced by the thick portion, and therefore the container is further suppressed from cracking.

In the lead-acid battery, the thick portion has an entire length in an extending direction of the corner, the entire length being longer than an entire length of the narrowed portion in the extending direction of the corner. A long and easily cracking portion is thickened as the thick portion in this configuration. The corner of the container can be thus further suppressed from cracking.

In the lead-acid battery, the power generating element is an element that includes a positive electrode plate and a negative electrode plate alternately layered with a separator being interposed therebetween, and the narrowed portion of the container is narrowed in a direction crossing with a layered direction of the element. The element has a width set in accordance with the width of the narrowed portion. The thick portion in this configuration is formed within the range not inwardly beyond the narrowed portion. The element does not need to be reduced in width and the battery can be kept in performance.

In the lead-acid battery, the container accommodates flowable electrolyte solution. A container of a liquid lead-acid battery contains a large amount of electrolyte solution and is thus largely affected by expansion in volume. This configuration is thus suitable for such a liquid lead-acid battery.

The lead-acid battery further includes a lid member sealing an opening of the container. The thick portion is located closer to the opening of the container than the narrowed portion, and the lid member includes a rib joined to the outer wall of the container, and an outer peripheral wall that is spaced apart from the rib and surrounds the outer wall of the container. If no thick portion is provided near the opening of the container, there is a gap between the rib to be joined to the lid member and the outer peripheral wall, and the area near the opening of the container is likely to warp. In contrast, the thick portion is provided near the opening of the container in this configuration, in which the container is less likely to warp and the corner of the container can be further suppressed from cracking.

<Embodiment 1>

The embodiment 1 is described with reference to FIGS. 1 to 7.

1. Structure of Lead-acid Battery 10

Figure 2:
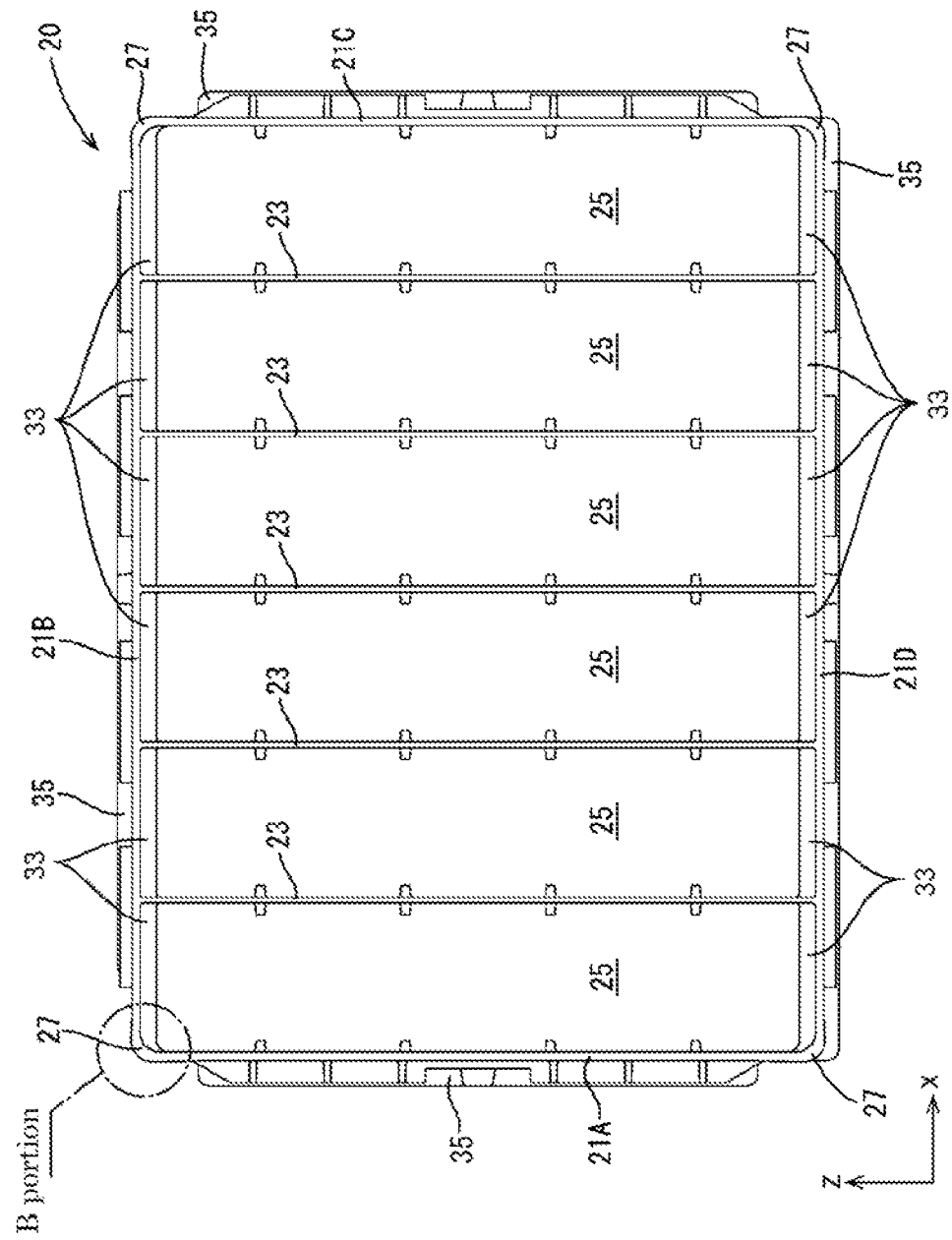
FIG. 2 is a plan view of a container.
Figure 3:
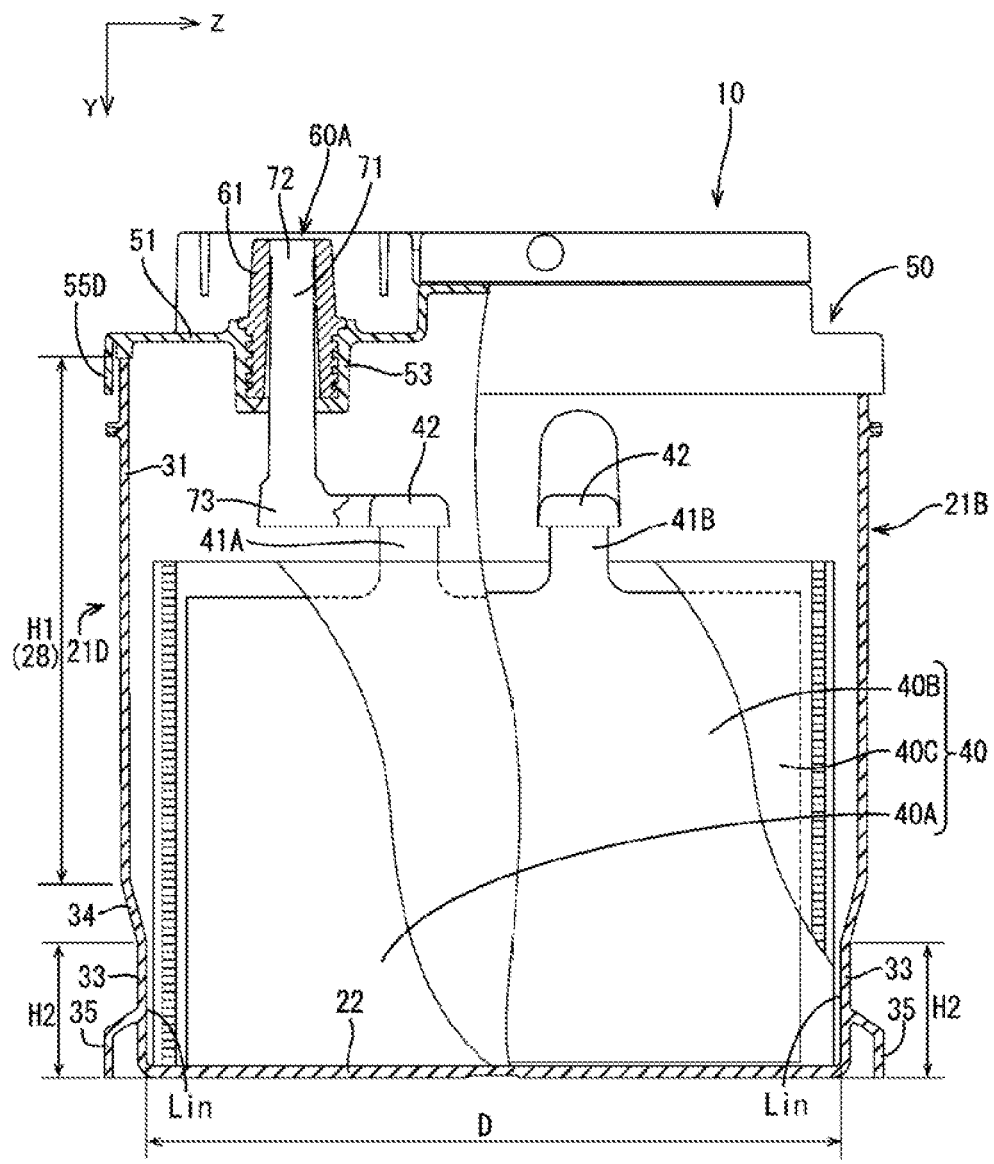
FIG. 3 is a vertical sectional view of the lead-acid battery (a sectional view taken along line A-A in FIG. 1.

A lead-acid battery 10 is applied to a vehicle and includes a container 20, an element 40 functioning as a power generating element, and a lid member 50, as shown in FIGS. 1 to 3. In the following description, a layered direction of plates 40A and 40B (a transverse width direction of the container 20) is called an X direction and a direction perpendicular to the layered direction of the plates 40A and 40B (a depth direction of the container 20) is called a Z direction. Furthermore, an extending direction of an outer wall 21 (a height direction of the container) is called a Y direction. The extending direction of the outer wall 21 corresponds to a direction of the container 20 extending from a bottom wall 22 toward the distal end of the outer wall.

The container 20 is made of synthetic resin. The container 20 has four outer walls 21A to 21D and the bottom wall 22, and has a cuboid box shape with an open top surface. As shown in FIG. 2, the container 20 has the interior divided into a plurality of cell chambers 25 by partitions 23. There are six cell chambers 25 in the transverse width direction of the container 20 (the X direction in FIG. 2), and the cell chambers 25 each accommodate the element 40 as well as flowable electrolyte solution.

As shown in FIG. 3, the element 40 is located so as to have its plate surface in a YZ direction with respect to the cell chambers 25, and includes the positive electrode plate 40A, the negative electrode plate 40B, and a separator 40C dividing the plates 40A and 40B. In the element 40, the positive electrode plate 40A and the negative electrode plate 40B are alternately layered in the X direction with the separator 40C being interposed therebetween. The plates 40A and 40B each have a grid filled with an active material, and are provided at the tops with lug portions 41A and 41B, respectively. The lug portions 41A and 41B are provided to couple the plates 40A and 40B having same polarity by way of straps 42 in the cell chambers 25.

Figure 4:
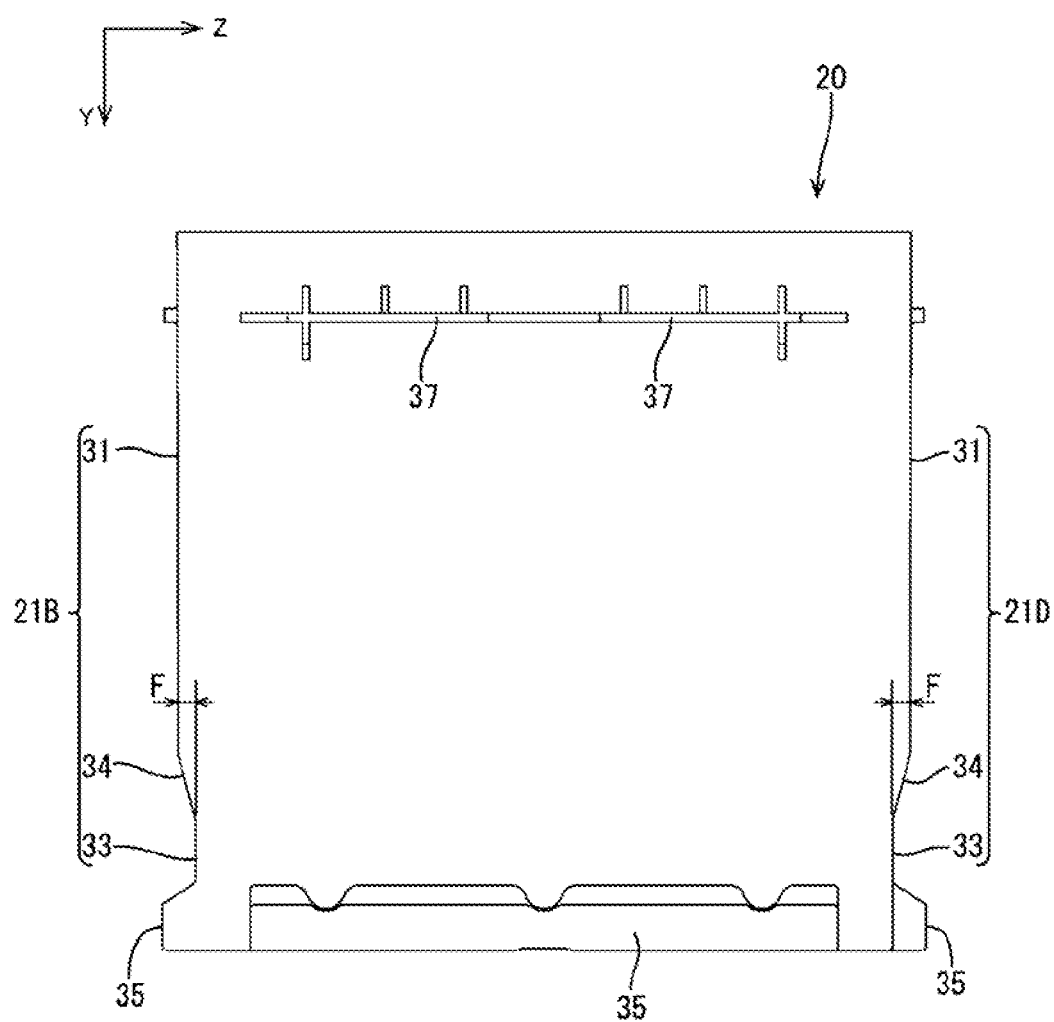
FIG. 4 is a side view of the container.

As shown in FIGS. 3 and 4, the outer walls (perpendicular to the partitions 23) 21B and 21D located at the respective ends of the container 20 in the Z direction are each provided with a proximal portion 31, a tapered portion 34, and a narrowed portion 33. The proximal portion 31 has a linear shape in the Y direction and is formed in a range of a size H1 indicated in FIG. 3. The proximal portion 31 is formed to extend in the entire width of each of the outer walls 21B and 21D (the entire width in the X direction).

The narrowed portion 33 is formed below the proximal portion 31. The narrowed portion 33 is recessed inward from the proximal portion 31 of the container 20, and decreases the internal space of the container 20 by a recessed amount (a size F indicated in FIG. 4). More specifically the narrowed portion 33 decreases the internal space of the container 20 in the Z direction in FIG. 3 (the width direction of the plates 40A and 40B).

The narrowed portions 33 are parallel to the proximal portion 31 of the outer walls 21B and 21D, and are each formed in the range of a height H2 from the bottom of corresponding one of the outer walls 21B and 21D. The narrowed portions 33 are formed to extend in the entire width of the outer walls 21B and 21D (the entire width in the X direction).

The tapered portion 34 is formed between the proximal portion 31 and the narrowed portion 33. The proximal portion 31 and the narrowed portion 33 are connected with the tapered portion 34 having a slant surface being interposed therebetween. There is thus no uneven surface between the proximal portion 31 and the narrowed portion 33.

The narrowed portion 33 is provided therebelow with legs 35. The legs 35 bulge outward from the narrowed portions 33 of the container. The legs 35 each have the lower surface flush with the bottom wall 22 of the container 20 and serve to stably support the container 20. The legs 35 each have the upper surface provided with a screw hole 35A and are screw fastened to fix the lead-acid battery 10 at a predetermined position to be attached.

The outer walls 21A and 21C located at the respective ends of the container 20 in the X direction are provided with no narrowed portions 33. The outer walls 21A and 21C are substantially flat, although the outer walls 21A and 21C each have a plate flange 37 at the top and the legs 35 at the bottom.

The lead-acid battery 10 is in conformity to the European standards, and the outer shape of the container 20 is defined in detail by the European standard (EN50342-2). The outer shape of the container 20 is inclusive of the shapes of the narrowed portions 33 and the corners 27 (the arc shapes of the outer peripheral surfaces), and is defined entirely by the European standard.

The lid member 50 is made of synthetic resin, and includes a main body 51 sealing the upper surface of the container 20, and outer peripheral walls 55A to 55D formed along the outer peripheral edge of the main body 51, as shown in FIG. 1.

Figure 5:
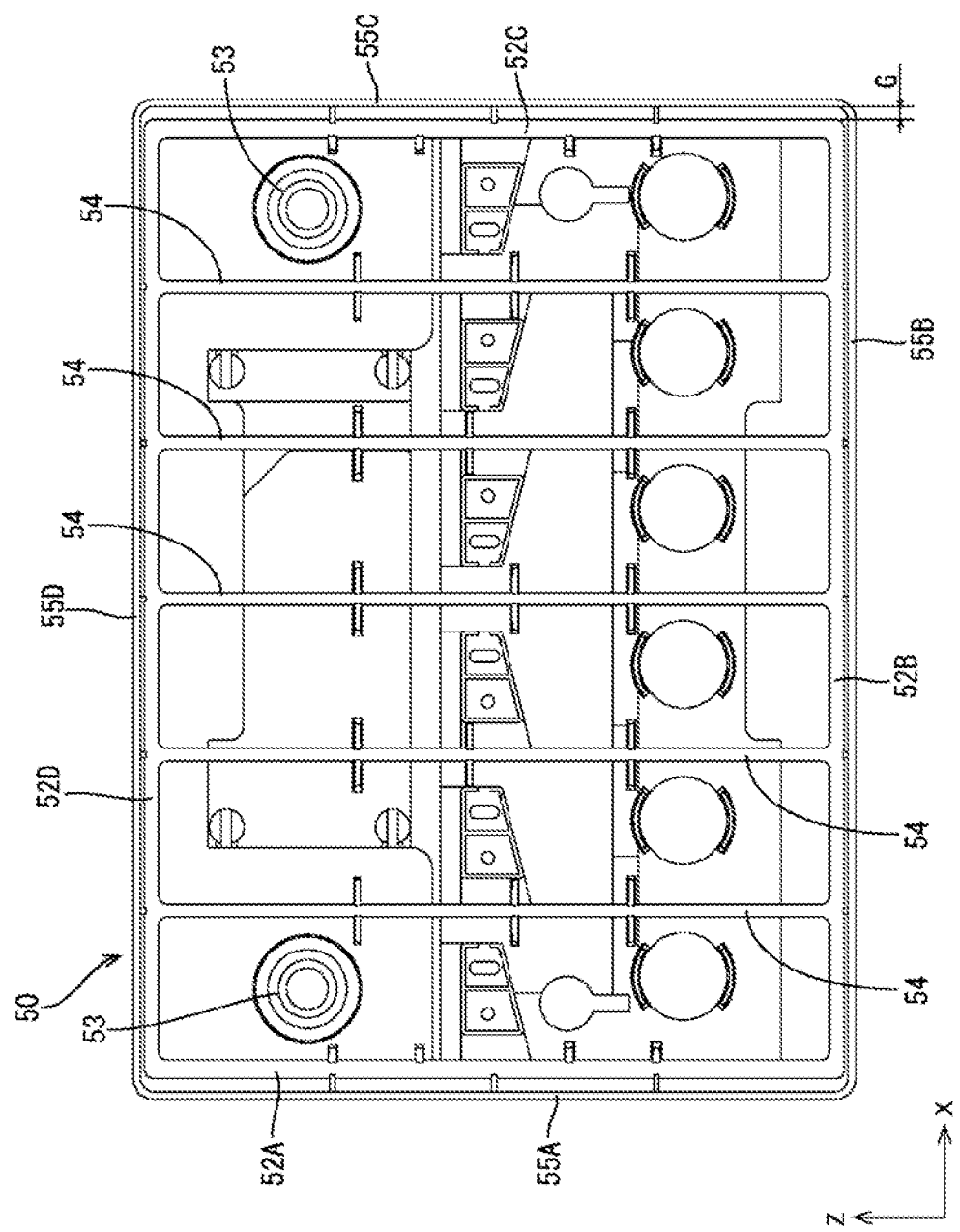
FIG. 5 is a bottom view of a lid member.

As shown in FIG. 5, the lid member 50 has a rear surface provided with ribs 52A to 52D and lid partitions 54. The ribs 52A to 52D are projections each having a predetermined width and protruding downward from the rear surface of a proximal portion of the lid member 50, and are provided so as to correspond to the outer walls 21A to 21D of the container 20, respectively. The lid partitions 54 are walls each having a predetermined width and protruding downward from the rear surface of the lid member 50, and are provided so as to correspond to the partitions 23 of the container 20.

The ribs 52A to 52D have the lower end surfaces abutting against the upper end surfaces of the outer walls 21A to 21D of the container 20, whereas the lid partitions 54 have the lower end surfaces abutting against the upper end surfaces of the partitions 23 of the container 20.

The outer peripheral walls 55A to 55D extend downward from the outer peripheral edge of the main body 51. The outer peripheral walls 55A to 55D are spaced apart by a gap G from the ribs 52A to 52D, respectively, and surround the upper ends of the outer walls 21A to 21D with the gaps G being provided therebetween. The gap G in FIG. 5 indicates a space between the outer peripheral wall 55C and the rib 52C. The entire periphery of the lid member 50 is welded to the container 20 by thermal welding or the like after the lid member 50 is assembled to the container 20. Specifically, the ribs 52A to 52D of the lid member 50 and the outer walls 21A to 21D of the container 20 are thermally welded, respectively, and the lid partitions 54 of the lid member 50 and the partitions 23 of the container 20 are thermally welded, respectively. This achieves the structure of sealing the cell chambers 25 of the container 20.

As shown in FIG. 1, the lid member 50 is provided with a positive electrode terminal 60A and a negative electrode terminal 60B near respective ends in the X direction. The positive electrode terminal 60A is structured identically to the negative electrode terminal 60B. The structure of the positive electrode terminal 60A is exemplarily described below.

As shown in FIG. 3, the positive electrode terminal 60A includes a bush 61 and a pole 71. The bush 61 is made of metal such as lead alloy and has a hollow cylindrical shape. The bush 61 penetrates a cylindrical mount 53 that is formed integrally with the main body 51 of the lid member 50, and has an upper half protruding from the upper surface of the main body of the lid member 50. The upper half of the bush 61, exposed from the upper surface of the main body of the lid member 50 functions as a terminal connector and is assembled with a connecting terminal (not shown) such as a harness terminal.

The lid member 50 is formed integrally with the bush 61 by pouring resin into a mold to which the bush 81 is inserted. The mount 53 is thus provided integrally with the bush 61 and covers the lower outer periphery of the bush 61 with no space being provided therebetween.

The pole 71 is made of metal such as lead alloy and has a columnar shape. The pole 71 is inserted to the bush 61 from downward. The pole 71 has an upper end 72 joined by welding to the bush 61, and a proximal end 73 joined to the strap 42 of the element 40.

2. Measure for Crack at Corner 27 of Container

In the liquid lead-acid battery 10, the electrolyte solution expands in volume when frozen. The corners 27 (four corners at each of which the two outer walls 21A to 21D intersect to each other) of the container 20 are thus likely to crack. In the lead-acid battery 10, the container 20 has the four corners 27 that are made thicker than the outer walls 21 and are thus suppressed from cracking.

Figure 6:
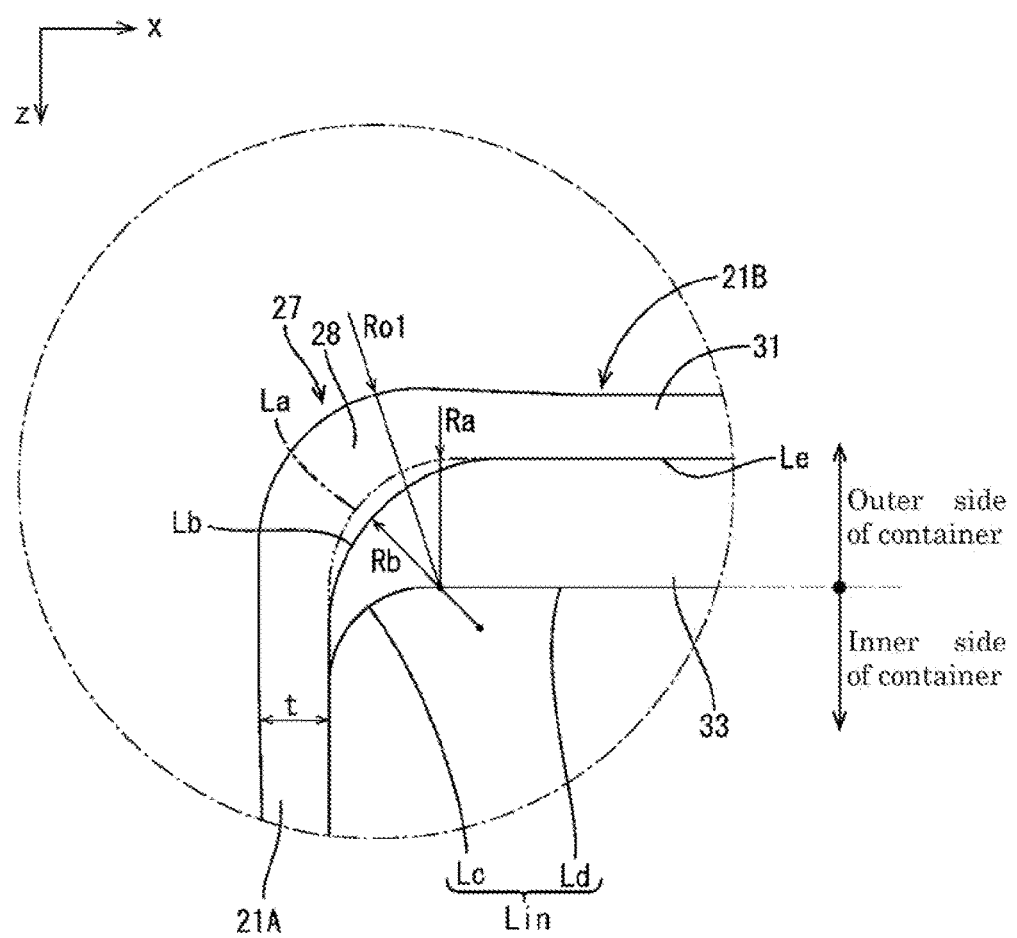
FIG. 6 is an enlarged view of a B portion in FIG. 2.

More specifically with reference to FIG. 6, in a case where the corner 27 of the container 20 has an inner peripheral arc of a radius "R" that is set to have, a value "Ra" obtained by subtracting a thickness t of the outer wall 21 from a radius "Ro1" of an outer peripheral arc, the corner 27 has a thickness equal to the thickness t of the outer wall 21 (see the following expression (1)). The radius Ra corresponds to a "reference radius" according to the present invention.

$$Ra = Ro1 - t \tag{1}$$

In another case where the radius "R" of the inner peripheral arc is set to have a value "Rb" larger than the value. "Ra" as indicated in the following expression (2), the arc has a line shifted inward to increase the thickness of the container as compared with the case of the value "Ra".

$$Rb > Ra \tag{2}$$

The radius "R" of the inner peripheral arc of the corner 27 is set to "Rb" in the lead-acid battery 10, so as to have a thick portion 28 thicker than the thickness t of the outer wall 2L The thick portion 28 is formed so as to correspond to the range of the proximal portion 31. The thick portion 28 according to the present embodiment is formed in the range from the upper end of the corner 27 to the tapered portion 34 (the range H1 indicated in FIG. 3).

In FIG. 6, reference sign "La" indicates the arc in the case where the radius of the inner peripheral arc is set to the "Ra", whereas reference sign "Lb" indicates the arc in the case where the radius of the inner peripheral arc is set to "Rb".

The container 20 has an accommodation space of a size in the width direction of the plates 40A and 40B (the length in the Z direction in FIG. 3), and the size is determined in accordance with a distance D between inner surfaces Lin of the right and left narrowed portions 33. If the inner peripheral arc Lb of the corner 27 is set within the range not inwardly beyond the narrowed portion 33, the accommodation space does not change in the width direction of the plates 40A and 40B.

In the lead-acid battery 10, the radius "Rb" of the arc Lb is determined such that the arc "Lb" does not shift inward (downward in FIG. 6) beyond the inner surface "Lin" of the narrowed portion 33 of the container. The arc "Lb" is located outside (above in FIG. 6) the inner surface "Lin" in this configuration. The corner 27 can be thus thickened with no reduction in accommodation space of the container 20. This achieves the configuration according to the present invention "the inner peripheral surface (the arc Lb in this example) of the corner 28 is located outside the internal space (outside the container in this example) with respect to the inner peripheral surface of the narrowed portion 33 (the inner surface Lin in this example)".

As indicated in FIG. 6, the inner surface "Lin" of the narrowed portion 33 includes both an inner surface "Ld" appearing to be stepped parallelly from an inner surface "Le" of the proximal portion 31, and an inner surface "Lc" of the arc between the respective ends in the X direction. As indicated in FIG. 6, if the arc "Lb" is located outside at least the arc "Le" in the inner surface "Lin", the accommodation space for the element 40 is not reduced. The radius Rb of the arc Lb is thus set to have a value as large as possible within the range where the arc "Lb" is not overlapped with the arc "Lc" in this example.

Figure 7:
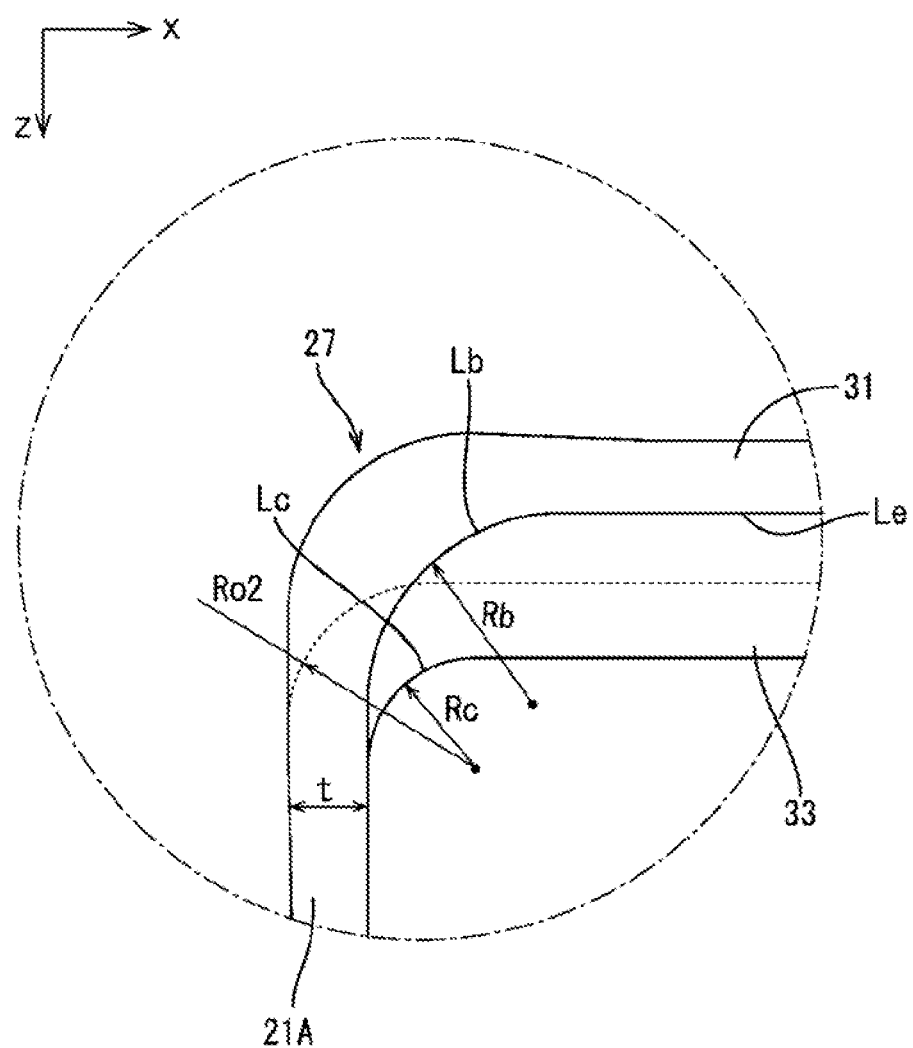
FIG. 7 is an enlarged view of the B portion in FIG. 2.

In the range corresponding to the narrowed portion 33 (the range indicated by the size H2 in FIG. 3) in the corner 27 of the container 20, the inner peripheral arc "Lc" of the radius R is set to "Rc=Ro2−t" in accordance with the expression (1) mentioned above. As indicated in FIG. 7, this portion has a thickness equal to the thickness t of the outer 21. In other words, the corner 27 of the container 20 in the lead-acid battery 10 is thickened only in the range H1 corresponding to the proximal portion 31 so as to exceed the thickness t of the outer wall 21, whereas the thickness in the range H2 corresponding to the narrowed portion 33 is equal to the thickness t of the outer wall 21.

The arcs at the corner 27 have the following exemplary numerical values. As indicated in FIG. 6, the outer peripheral arc Ro1 is 5 mm, the inner peripheral arc Ra is 3 mm the inner peripheral arc Rb is 5 mm, and the thickness t of the outer wall 21 is 2 mm. As indicated in FIG. 7, the outer peripheral arc Ro2 is 5 mm and the inner peripheral arc Rc is 3 mm.

As indicated by the following expression (3), the range H1 of the thick portion 28 is larger than the range H2 of the narrowed portion 33 in terms of the size relation therebetween.

$$H1 > H2 \quad (3)$$

If the range Hi of the thick portion 28 is smaller, the corner 27 is mainly thin. The corner 27 has rigidity that is mainly effected by the thinner portion and is not very high. The corner 27 is not durable against expansion in volume and is likely to crack at the thinner portion. in contrast, if the thickened range H1 is larger, the corner 27 has rigidity that is mainly effected by the thicker portion and is very high. The corner 27 is thus durable against expansion in volume and can be suppressed from cracking. The range "H1" corresponds to "the entire length of the thick portion 28 in the extending direction (the Y direction) of the corner" in the present invention, whereas the range "H2" corresponds to "the entire length of the narrowed portion 33 in the extending direction (the Y direction) of the corner" in the present invention.

The range corresponding to the tapered portion 34 in the corner 27 is a reducing section of the arc, and the inner peripheral arc at the corner 27 is changed in size from "Rb" to "Rc" in this section. Provision of such an arc reducing section eliminates a large change in shape, and stress is thus unlikely to concentrate locally. This configuration can thus further suppress crack at the corner 27.

3. Description of Effects

The corner 27 of the container 20 is thickened in the lead-acid battery 10. This configuration can suppress a crack at the corner 27 due to expansion in volume. Particularly, the lead-acid battery 10 is a liquid lead-acid battery and the container 20 contains a large amount of flowable electrolyte solution, and is thus largely influenced by expansion in volume. The corner 27 is thus likely to crack. The present invention is effective to this case.

Furthermore, the corner 27 of the container 20 is thickened inward and the container 20 does not need to be changed in outer shape. Moreover, the corner 27 of the container 20 is thickened within the range not inwardly beyond the narrowed portion 33. This configuration does: not reduce the accommodation space of the container 20 (the accommodation space in the width direction of the plates 40A and 40B). Accordingly, insertability and size of each of the plates 40A and 40B can be kept while the corner 27 of the container 20 can be suppressed from cracking.

The inner periphery of the corner 27 has the arc shape. Stress is thus unlikely to concentrate at one point and the corner 27 can be further suppressed from cracking.

The container 20 includes the four outer walls 21A to 21D and the bottom. wall 22, and has a box shape that opens upward. In the box shape container 20, the outer walls 21A to 21D expand when the electrolyte solution is frozen and increased in volume, and thus stress concentrates at the corner 27 at which two of the outer walls 21A to 21D intersect and a crack is likely to occur. Because the corner 27 at which two of the outer walls 21A to 21D intersect is reinforced as the thick portion 28, which otherwise is likely to cause a crack, in the lead-acid battery 10, the container 20 is further suppressed from cracking.

In the container 20, the narrowed portion 33 is disposed at a bottom side of the outer walls 21B, 21S. Thus, a crack is likely to occur at the top side in which a larger amount of electrolyte solution is contained and the volume expansion of the electrolyte solution in accordance with freezing thereof is larger.

In addition, because the metallic pole 71 is disposed at the top side of the container 20, the top side has a higher thermal conductivity than the bottom side, and thus the electrolyte solution is likely to frozen and unfreezes depending on the variation of the environmental temperature. When the environmental temperature is below the freezing point, the temperature of the electrolyte solution in the top side is lowered due to the influence of the pole 71 and the electrolyte solution begins to be frozen from the top side. When the environmental temperature exceeds the freezing point, the temperature of the electrolyte solution in the top side rises due to the influence of the pole 71 and the electrolyte solution begins to defreeze from the top side. In this manner, the electrolyte solution in the top side is likely to frozen and unfreezes depending on the variation of the environmental temperature, and the volume thereof expands and contracts frequently. Thus, the corner 27 closer to the opening and the top side is likely to crack.

In the lead-acid battery 10, in the corner 27, at which two of the outer walls 21A to 21D intersect, a portion that is closer to the opening and top side than the narrowed portion 33 comprises the thick portion 28. In other words, the corner 27 closer to the opening side where a crack is likely to occur is reinforced by the thick portion 28, and therefore the container 20 is further suppressed from cracking.

The lead-acid battery 10 has the gaps G between the ribs 52 and the outer peripheral walls 55, so that the container 20 can easily warp in the area near the opening. The lead-acid battery 10 is thus provided with the thick portion 28 in the easily warped area near the opening of the container 20. Accordingly, the corner 27 can be further suppressed from cracking. The area near the opening is closer to the opening of the container than the narrowed portion 33.

<Embodiment 2>

Figure 8:
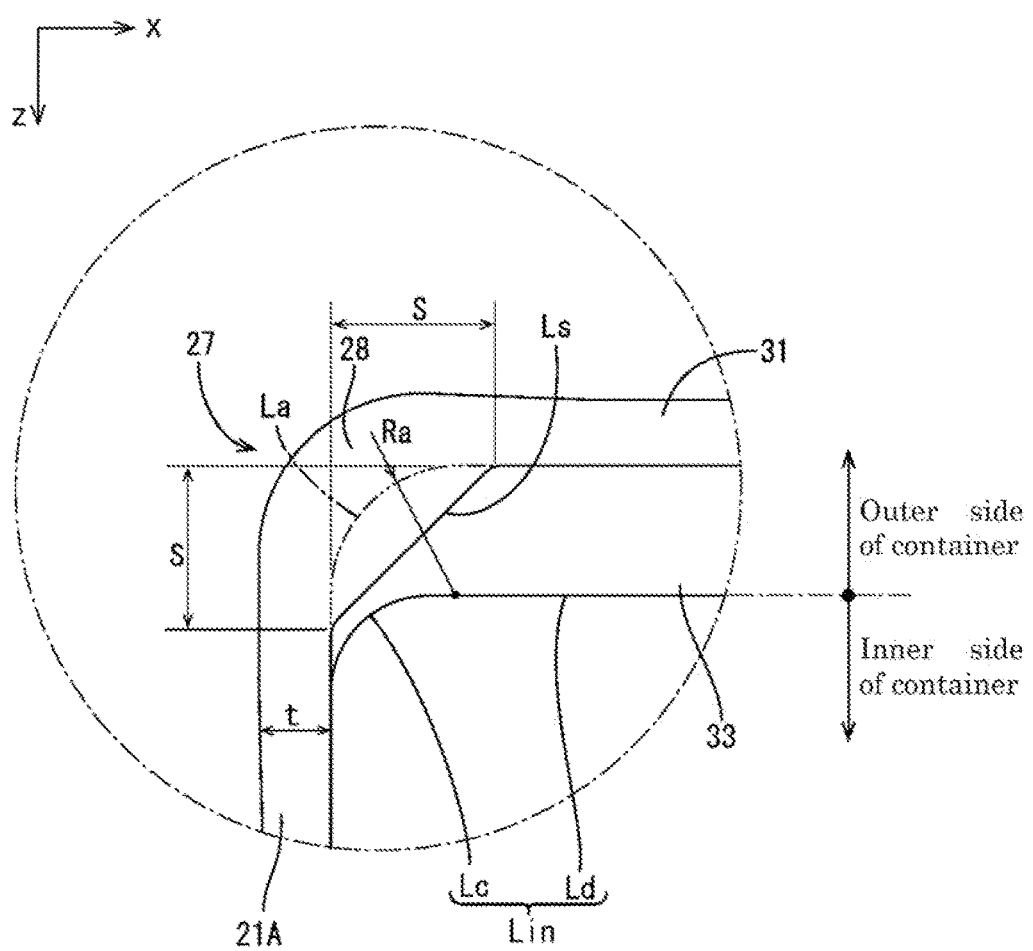
FIG. 8 is an enlarged view of a corner of a container according to an embodiment 2 of the present invention.

The embodiment 2 of the present invention is described next with reference to FIG. 8.

The corner 27 according to the embodiment 1 is thickened by increasing the radius R of the inner peripheral arc. The corner 27 according to the embodiment 2 is thickened by having the inner surface slanted to the outer wall 21 (the shape of the container 20 when viewed in the planar direction.)

Specifically, the inner surface of the corner 27 of the container 20 is slanted at 45 degrees in the range corresponding to the proximal portion 31 of the outer wall 21 (the range indicated as the size H1 in FIG. 3). A length S of a slant line Ls in the X direction (as well as in the Z direction), in this example, is larger than the radius Ra of the arc La as indicated in FIG. 8. The corner 27 can be thickened similarly to the embodiment 1 also by slanting the inner surface of the corner 27. This configuration can suppress a crack at the corner 27 due to expansion in volume.

The slant line Ls is located outside (above in FIG. 8) the container 20 with respect to the inner surface Lin of the narrowed portion 33. This configuration does not reduce the accommodation space of the container 20 as in the embodiment 1. Accordingly, insertability and size of each of the plates 40A and 40B can be kept while the corner 27 of the container 20 can be suppressed from cracking.

<Other Embodiments>

The present invention is not limited to the embodiments described above and illustrated in the drawings. The following exemplary embodiments are also included in the technical scope of the present invention.

(1) The embodiments 1 and 2 each exemplify the lead-acid battery 10 in conformity to the European standards, The present invention is applicable to any lead-acid battery in which an outer wall 21 of a container 20 is partially provided with a narrowed portion 33 to reduce the internal space, as well as to the lead-acid battery in conformity to the European standards.

(2) The corner 27 is thickened in the entire range H1 corresponding to the proximal portion 31 in the embodiment 1. The thickened range has only to be at least larger than the range H2 corresponding to the narrowed portion 33, and the corner 27 can be thickened only partially in the range H1.

(3) The inner surface of the corner 27 is slanted at 45 degrees in the embodiment 2. The corner 27 has only to be thickened and the slant line Ls can have a degree other than 45 degrees. Even in the case where the slant line has 45 degrees, the length S of the slant line Ls in the X direction can be equal to or more than the radius Ra.

(4) The above embodiments 1 and 2 each describe the liquid lead-acid battery as an exemplary lead-acid battery. The present invention is also applicable to a valve regulated lead-acid battery that includes a container hardly containing flowable electrolyte solution.

(5) The above embodiments 1 and 2 describe examples in which the corner 27 at which two of the outer walls 21A to 21D intersect comprise the thick portion, In a case where the narrowed portion 33 is disposed at a center portion (center portion in Y direction) of the outer walls 21A to 21D, a corner at which the outer walls 21A to 21D and the bottom wall 22 intersect may comprise a thick portion.

What is claimed is:

1. A lead-acid battery comprising:
a power generating element; and
a container accommodating the power generating element and including a bottom wall, outer walls and a corner at which the outer walls intersect, at least one of the outer walls including a first portion and a second portion that recesses inward from the first portion,
wherein a portion of the corner corresponding to the first portion includes a thick portion that is thickened inward within a range not inwardly beyond the second portion to be thicker than the outer wall and a portion of the corner corresponding to the second portion.

2. The lead-acid battery according to claim 1, wherein the corner corresponding to the first portion has an inner peripheral surface located outside an inner peripheral surface of the second portion in an internal space of the container.

3. The lead-acid battery according to claim 1, wherein when the corner equal in thickness to the outer wall has an inner peripheral radius defined as a reference radius, and
the inner peripheral radius of the corner corresponding to the first portion is larger than the reference radius in a range not inwardly beyond the second portion.

4. The lead-acid battery according to claim 1, wherein the corner corresponding to the first portion has an inner surface slanted from the outer wall within a range not inwardly beyond the second portion.

5. The lead-acid battery according to claim 1, wherein the container has a box shape with an opening in one direction,
the second portion is disposed at a bottom side of the at least one of the outer walls, and
the first portion is closer to the opening than the second portion is.

6. The lead-acid battery according to claim 5, wherein the thick portion has an entire length of the first portion in an extending direction of the corner, the entire length of the first portion being longer than an entire length of the second portion in the extending direction of the corner.

7. The lead-acid battery according to claim 1, wherein the power generating element is an element that includes a positive electrode plate and a negative electrode plate alternately layered with a separator being interposed therebetween,
each of the outer walls facing each other in a direction perpendicular to a layered direction of the element includes the first portion and the second portion, and
a first length between the first portions of the outer walls facing each other is wider than a second length between the second portions of the outer walls facing each other.

8. The lead-acid battery according to claim 1, wherein the container accommodates flowable electrolyte solution.

9. The lead-acid battery according to claim 1, further comprising a lid member sealing an opening of the container,
wherein the thick portion is located closer to the opening of the container than the second portion is, and
the lid member includes a rib joined to the outer wall of the container, and an outer peripheral wall that is spaced apart from the rib and surrounds the outer wall of the container.

10. A lead-acid battery comprising:
a power generating element; and
a container accommodating the power generating element and including a bottom wall, outer walls and a corner at which the outer walls intersect,
wherein at least one of the outer walls includes a first portion, a second portion that recesses inward from the first portion and a tapered portion connecting the first portion and the second portion, wherein the corner corresponding to the first portion is thicker than the corner corresponding to the second portion, and wherein a thickness of the corner is changed in the corner corresponding to the tapered portion.

11. The lead-acid battery according to claim 10, wherein the thickness of the corner corresponding to the tapered portion gradually reduces in a direction from the first portion to the second portion.

12. A lead-acid battery comprising:

a power generating element; and a container accommodating the power generating element and including an outer wall that includes a first portion and a second portion that recesses inward from the first portion, the container being made of synthetic resin, wherein the container includes a corner of a thick portion that is thickened inward within a range not inwardly beyond the second portion to be thicker than the outer wall.

* * * * *